US009421676B2

(12) United States Patent
Hondo

(10) Patent No.: US 9,421,676 B2
(45) Date of Patent: Aug. 23, 2016

(54) EXTRACTION TOOL FOR TANGLESS SPIRAL COIL INSERT

(71) Applicant: Nippon Sprew Co., Ltd., Minato-ku, Tokyo (JP)

(72) Inventor: Fusahide Hondo, Tokyo (JP)

(73) Assignee: Nippon Sprew Co., Ltd., Tokyo (JP)

( * ) Notice: Subject to any disclaimer, the term of this patent is extended or adjusted under 35 U.S.C. 154(b) by 0 days.

(21) Appl. No.: 14/403,766

(22) PCT Filed: May 20, 2013

(86) PCT No.: PCT/JP2013/064552
§ 371 (c)(1),
(2) Date: Nov. 25, 2014

(87) PCT Pub. No.: WO2013/180039
PCT Pub. Date: Dec. 5, 2013

(65) Prior Publication Data

US 2015/0096160 A1 Apr. 9, 2015

(30) Foreign Application Priority Data

May 29, 2012 (JP) ................................ 2012-122457

(51) Int. Cl.
*B23Q 1/00* (2006.01)
*B25B 27/00* (2006.01)
*B25B 27/14* (2006.01)

(52) U.S. Cl.
CPC ............... *B25B 27/00* (2013.01); *B25B 27/143* (2013.01); *Y10T 29/53991* (2015.01)

(58) Field of Classification Search
CPC ...... B25B 27/00; B25B 27/14; B25B 27/143; Y10T 29/53691
USPC ........... 29/255, 270, 278, 280, 244, 238–239, 29/272, 263, 225–230, 254, 282, 240.5; 81/443
See application file for complete search history.

(56) References Cited

U.S. PATENT DOCUMENTS 4,528,737 A * 7/1985 Cosenza ............... B25B 27/143 29/240.5
4,553,303 A 11/1985 Yamamoto
(Continued)

FOREIGN PATENT DOCUMENTS

EP 0153267 A2 8/1985
EP 0153268 A2 8/1985
(Continued)

OTHER PUBLICATIONS

Int'l Search Report issued Aug. 27, 2013 in Int'l Application No. PCT/JP2013/064552.
(Continued)

*Primary Examiner* — Monica Carter
*Assistant Examiner* — Nirvana Deonauth
(74) *Attorney, Agent, or Firm* — Panitch Schwarze Belisario & Nadel LLP

(57) ABSTRACT

An extraction tool for a tangless spiral coil insert that is simple in structure and is also easy in manufacture and assemble as compared with a conventional tool, accordingly that allows reduction in manufacturing cost and besides that is excellent in operability is provided. An extraction tool 1 for a tangless spiral coil insert of the present invention has, for extracting the tangless spiral coil insert which has been attached to a work from the work, a mandrel 41 a leading end section of which is constituted as a screw shaft 45, and a pivotal claw 80 provided with an actuation section 82 which is a slender member and is provided at one end thereof with a claw section 81 engaging with a notch of an end coil section of the tangless spiral coil insert positioned on a surface side of the work and a support section 83 formed integrally with the actuation section 82.

2 Claims, 10 Drawing Sheets

(56) References Cited

U.S. PATENT DOCUMENTS

| | | | |
|---|---|---|---|
| 5,212,865 | A | 5/1993 | Davis et al. |
| 6,421,899 | B1 | 7/2002 | Zitnay |

FOREIGN PATENT DOCUMENTS

| | | | |
|---|---|---|---|
| EP | 0615818 | A1 | 9/1994 |
| JP | S60-191775 | A | 9/1985 |
| JP | 2001-150363 | A | 6/2001 |
| JP | 3849720 | B2 | 11/2006 |
| JP | 2012-115965 | A | 6/2012 |

OTHER PUBLICATIONS

Office Action issued Sep. 14, 2015 in NZ Application No. 700286.

* cited by examiner

EXTRACTION TOOL FOR TANGLESS SPIRAL COIL INSERT

CROSS-REFERENCE TO RELATED APPLICATION

This application is a Section 371 of International Application No. PCT/JP2013/064552, filed May 20, 2013, which was published in the Japanese language on Dec. 5, 2013, under International Publication No. WO 2013/180039 A1, and the disclosure of which is incorporated herein by reference.

TECHNICAL FIELD

The present invention relates to an extraction tool for a tangless spiral coil insert for extracting a tangless spiral coil insert which has been attached to a work from the work.

BACKGROUND ART

When a weak female screw makes it impossible to obtain a high tightening force while directly tapping into a work comprising a light metal such as aluminum, plastics, or cast iron, it is conventional practice to use a spiral coil insert for the purpose of guaranteeing a high reliable screw tightening.

There are a tanged spiral coil insert and a tangless spiral coil insert, but the tanged spiral coil insert requires an operation of removing a tang, after being attached to a work, and further an operation of collecting the tang removed. Therefore, the tangless spiral insert, which does not require such operations, is occasionally used.

A patent literature 1 discloses an attachment tool for such a tangless spiral coil insert.

This will be described below with reference to FIGS. 7 to 9 appended to the present patent application.

An attachment tool 300 is provided with a tubular member 301, and a mandrel assembly 302 supported by the tubular member 301. A pivotal claw 303 is disposed in a hollow 304 formed in a longitudinal direction of the mandrel assembly 302, and the pivotal claw 303 is provided with a hook section 305 engaging with a notch 101 (FIG. 9) of an end coil section 100*a* of a tangless spiral coil insert 100 at one leading end thereof.

In this example, the pivotal claw 303 is biased about a pivotal shaft 307 by a spring 306, and, the pivotal claw 303 is configured to pivot on the pivotal shaft 307 so that the hook section 305 sinks into the notch 101 of the end coil section 100*a* on a coil-insertion direction outlet side of the coil insert 100 when the mandrel assembly 302 moves in a direction of an arrow 308 and the other end 309 of the pivotal claw 303 has entered a hole formed in the mandrel assembly 302.

The attachment tool 300 for a tangless spiral coil insert described in the patent literature 1 was excellent in operability, but in particular the mandrel assembly 302 provided with the pivotal claw 303 was complex in structure, and was difficult to manufacture or assemble, and accordingly resulted in a factor in high product cost.

Therefore, the present inventor proposed an insertion tool described in a patent literature 2.

That is, as shown in FIGS. 6(*a*) and 6(*b*) appended to the present patent application, the insertion tool described in the patent literature 2 is provided, for inserting a tangless spiral coil insert 100 (see FIGS. 7 and 9) to a work, with a mandrel 41 a leading end section of which is constituted as a screw shaft 45, and a pivotal claw 80 which is a slender member and is provided with an actuation section 82 provided at one end thereof with a claw section 81 engaging with a notch 101 of an outlet-side end coil section 100*a* of the tangless spiral coil insert 100 screwed to the screw shaft 45 and a support section 83 formed integrally with the activation section 82. The pivotal claw 80 is attached to a pivotal-claw attachment groove 71, the support section 83 is pivotally attached to the mandrel 41 by a pivotal shaft 84, and biasing means 88 (88*a*, 88*b*) acts on the support section 83 to bias the claw section 81 outward in a radial direction of the screw shaft 45 such that a hook section 90 formed in the claw section 81 elastically engages with the notch 101 of the tangless spiral coil insert 100.

An insertion tool for a tangless spiral coil insert having thus configured is simple in structure and easy in manufacture and assemble as compared with a conventional tool, and, accordingly it can be reduced in manufacturing cost, and besides, is excellent in operability.

PRIOR ART DOCUMENT

Patent Literature

Patent Literature 1: Publication of Japanese Patent No. 3849720

Patent Literature 2: Japanese Patent Application No. 2010-269710

SUMMARY OF THE INVENTION

Problems to be Solved by the Invention

The present inventor has focused on the characterized configuration of the insertion tool for a tangless spiral coil insert described in the patent literature 2 and, as a result of studying whether or not the configuration of such an insertion tool can be applied to an extraction tool for a tangless spiral coil insert, has found that realization can be achieved considerably favorably.

That is, an object of the present invention is to provide an extraction tool for a tangless spiral coil insert that is simple in structure and is also easy in manufacture and assemble as compared with a conventional tool, accordingly that can be reduced in manufacturing cost and besides, is excellent in operability.

Means for Solving the Problems

The above object is achieved by an extraction tool for a tangless spiral coil insert according to the present invention. In summary, the present invention is an extraction tool for a tangless spiral coil insert comprising, for extracting the tangless spiral coil insert which has been attached to a work from the work, a mandrel a leading end section of which is constituted as a screw shaft, and a pivotal claw provided with an actuation section which is a slender member and is provided at one end thereof with a claw section engaging with a notch of an end coil section of the tangless spiral coil insert positioned on a surface side of the work and a support section integrally formed with the actuation section, wherein the mandrel has a small-diameter shaft section formed with the screw shaft and a slender-cylindrical tubular shaft section which is formed to continuously connect to the small-diameter shaft section and an outer diameter of which is larger than an outer diameter of the small-diameter shaft section;

a pivotal-claw attachment groove is formed in the small-diameter shaft section and the tubular shaft section from an end face of the small-diameter shaft section in an axial direction of the mandrel over a predetermined length in order to install the pivotal claw;

the pivotal claw is attached to the pivotal-claw attachment groove and the support section is pivotally attached to the mandrel by a pivotal shaft;

the tubular shaft section is provided with biasing means acting on the support section of the pivotal claw; and the biasing means acts on the support section to bias the claw section outward in a radial direction of the screw shaft such that a hook section formed on the claw section elastically engages with the notch of the end coil section of the tangless spiral coil insert positioned on a surface side of the work.

According to an aspect of the present invention, the biasing means is provided with a compression coil spring housed inside the tubular shaft section and a spring reception member caused to abut on an end face of the support section of the pivotal claw by the compression coil spring.

According to another aspect of the present invention, the pivotal claw is constituted as a slender plate member, the claw section is formed in a plate-thickness end-face region of a predetermined distance from a leading end of the plate member, a rear end face of the support section abutting on the spring reception member of the biasing means is inclined in a widthwise direction, and the spring reception member engages with the inclined rear end face to bias the claw section outward in a radial direction of the screw shaft.

According to another aspect of the present invention, a guide section further projecting beyond the pivotal claw outward in the axial direction of the screw shaft to be capable of being screwed or inserted into the coil insert is integrally formed in a leading end section of the screw shaft.

Effects of the Invention

According to the present invention, the extraction tool for a tangless spiral coil insert is simple in structure and is also easy in manufacture and assemble as compared with a conventional tool. Accordingly, the extraction tool for a tangless spiral coil of the present invention can be reduced in manufacturing cost, and besides, is excellent in operability.

BRIEF DESCRIPTION OF THE DRAWINGS

FIG. 4-1 is a perspective view of an embodiment of the extraction tool for a tangless spiral coil insert according to the present invention;

FIGS. 4-2(*a*) and 4-2(*b*) are perspective views for explaining one example of use of the extraction tool for a tangless spiral coil insert according to the present invention;

EMBODIMENTS FOR CARRYING OUT THE INVENTION

An extraction tool for a tangless spiral coil insert according to the present invention will be described below in further detail with reference to the drawings.

Embodiment 1

(Overall Tool Configuration)

Figure 1:
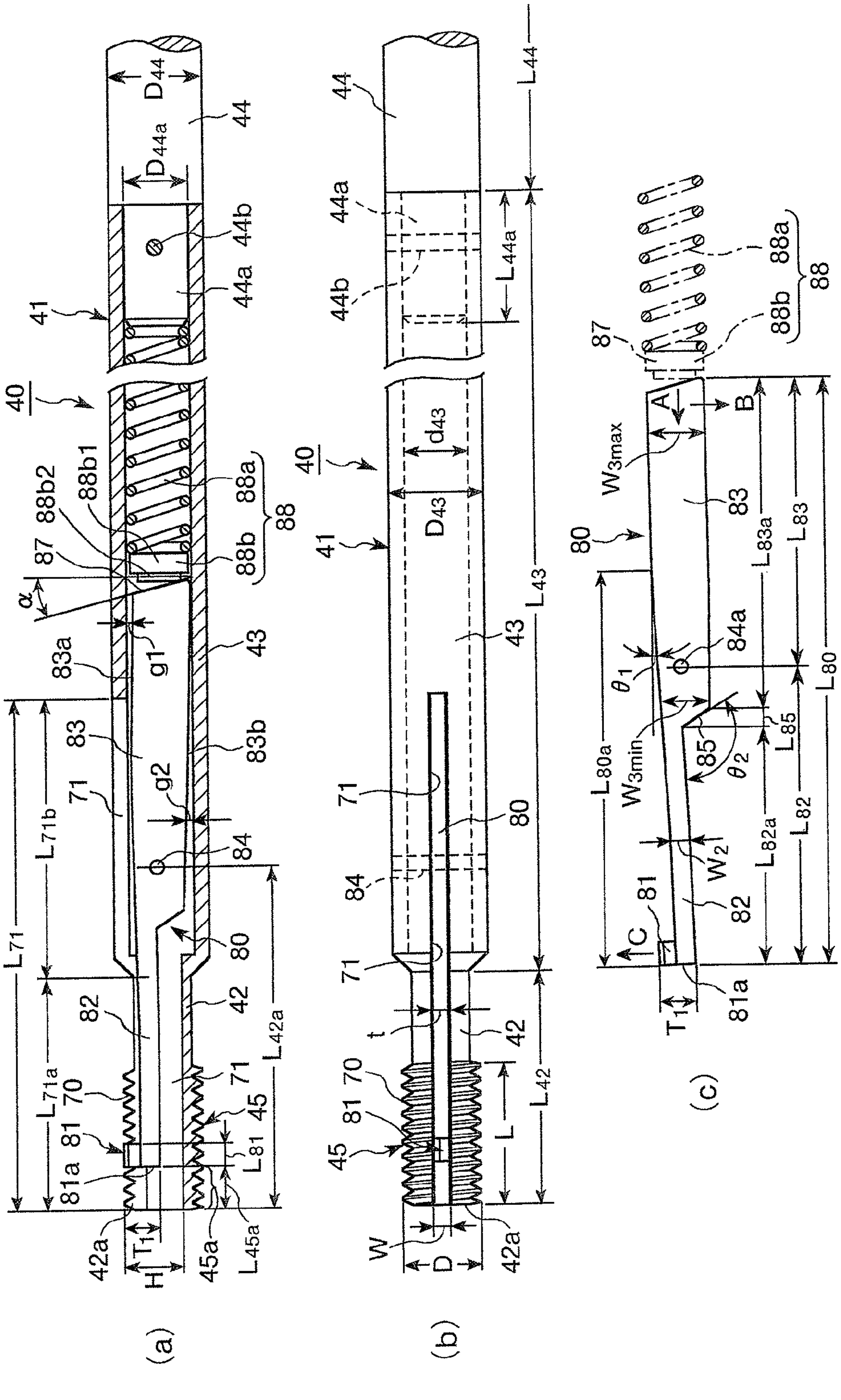
FIG. 1(*a*) is a central longitudinal sectional view of a mandrel to which a pivotal claw is attached in an embodiment of an extraction tool for a tangless spiral coil insert according to the present invention, FIG. 1(*b*) is a plane view of the mandrel to which the pivotal claw is attached, and FIG. 1(*c*) is a front view of the pivotal claw.
Figures 1, 4:
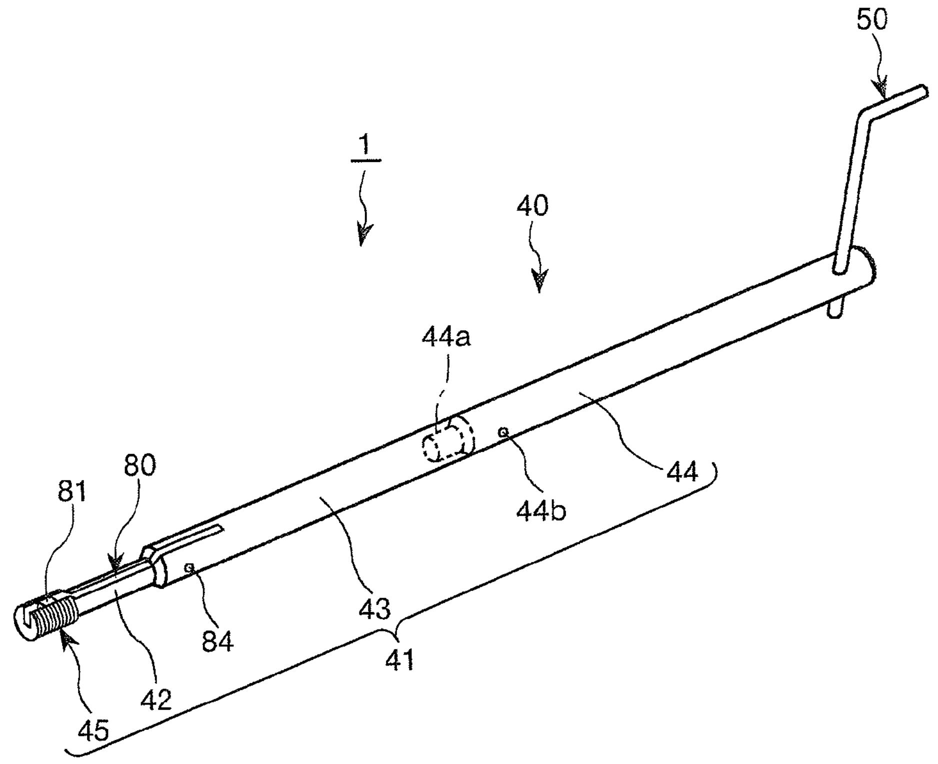
Figures 2, 4:
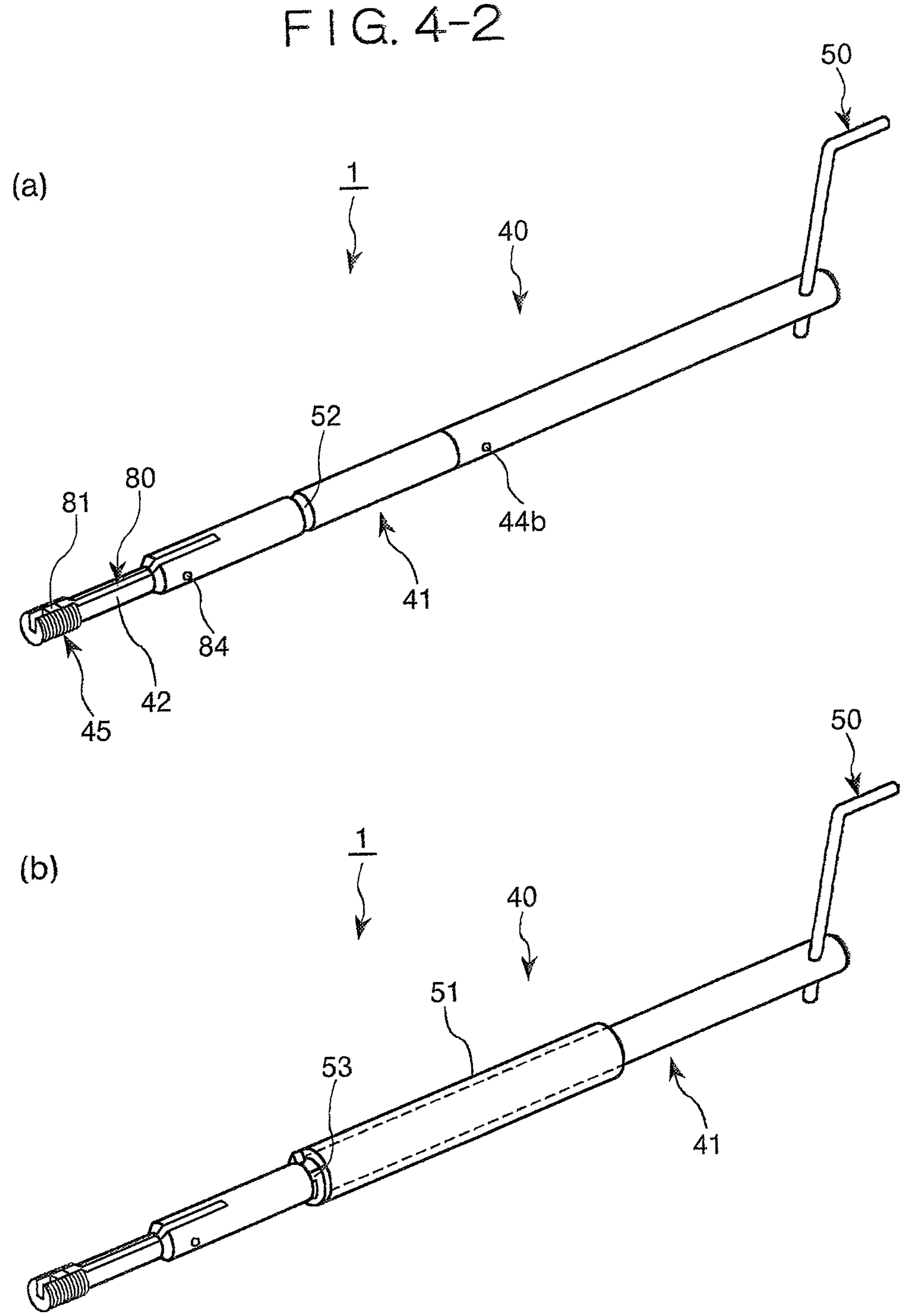

FIG. 4-1 illustrates an overall configuration of an embodiment of an extraction tool 1 for a tangless spiral coil insert in accordance with the present invention. According to the present embodiment, the extraction tool 1 for a tangless spiral coil insert is of a manual type, and has a mandrel assembly 40.

Figure 2:
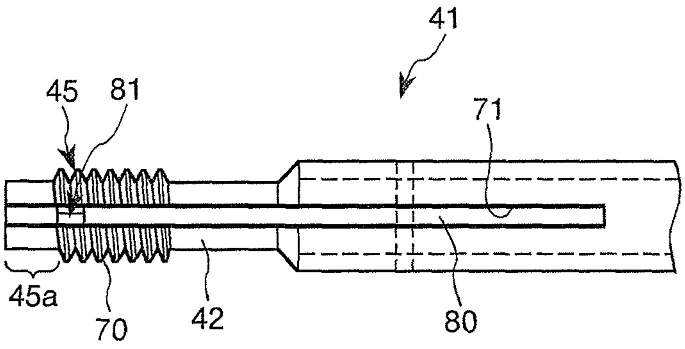
FIG. 2 is a partial plane view showing another embodiment of the screw shaft.

The mandrel assembly 40 is provided with a mandrel 41. A mandrel drive handle 50 is provided on the mandrel 41, so that the mandrel 41 is configured to be rotationally driven manually. A screw shaft 45 configuring a leading end section of the mandrel 41 is rotated by rotating the mandrel 41 by the drive handle 50. At this time, in order to facilitate rotational operation of the mandrel 41 with the mandrel drive handle 50, as shown in FIG. 4-2(*b*), a grip pipe 51 which an operator can grasp can be rotatably attached to the mandrel 41. The grip pipe 51 can be attached to the mandrel 41, for example, by forming annular groove 52 in the mandrel 41 in advance and attaching a retaining ring 53 to the groove 41 as necessary.

Figure 5:
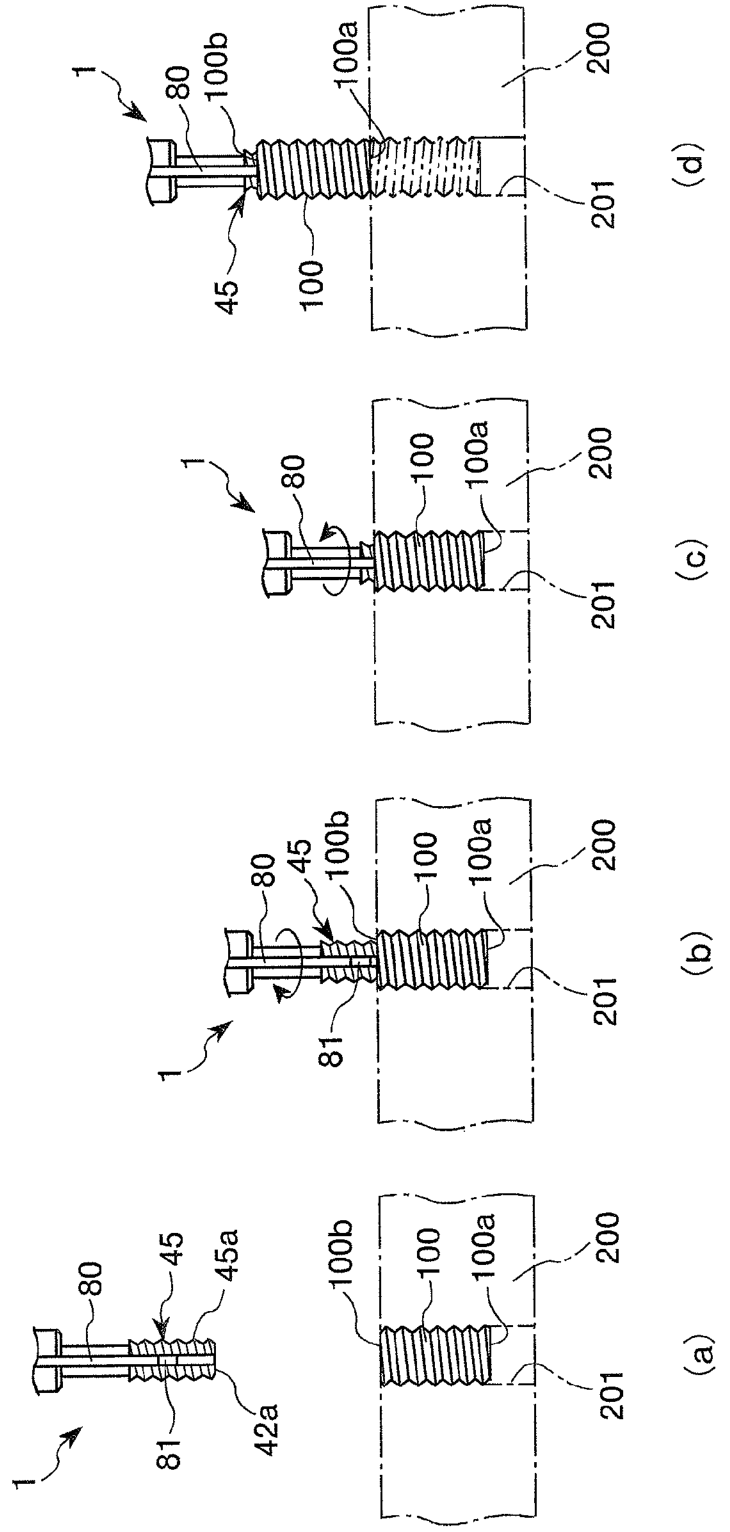
FIGS. 5(*a*), 5(*b*), 5(*c*) and 5(*d*) are sectional views for explaining motion and operation of the extraction tool for a tangless spiral coil insert according to the present invention shown in FIG. 4.

The extraction tool 1 for a tangless spiral coil insert of the present invention is one for extracting a tangless spiral coil insert 100 which has been already attached to a work 200, as shown in FIGS. 5(*a*) to 5(*d*), and accordingly, by causing the leading-end screw shaft 45 of the extraction tool 1 for a tangless spiral coil insert to adapt to an inlet-side coil section (namely, a coil section on a surface side of the work which the extraction tool 1 approaches) 100*b* of the coil insert 100 which has been attached to the work 200 and rotating the mandrel drive handle 50, the screw shaft 45 of the mandrel 41 is screwed from the inlet-side coil section 100*b* of the coil insert 100 toward an other-side coil section 100*a* opposite to the inlet-side coil section 100*b*, namely, into the coil insert (FIGS. 5(*a*) and 5(*b*)). Next, when the mandrel drive handle 50 is reversed, the screw shaft 45 rotates reversely to the last rotation to be returned from the inside of the coil insert in a direction of the inlet-side coil section 100*b* for disengagement from the coil insert 100, so that the claw section 81 engages with the notch section 101 of the coil section 100*b* and the coil insert 100 is extracted from the work 200. This will be described later in detail.

(Mandrel Assembly)

Next, the mandrel assembly 40 that configures a characterized section of this invention will be described with reference to FIGS. 1(*a*) to 1(*c*), FIG. 2, FIGS. 3(*a*) to 3(*d*), and FIG. 4.

As described above with reference to FIG. 4, the mandrel assembly 40 is provided with the mandrel 41, and according to this embodiment, a leading end section of the mandrel 41 is constituted as the screw shaft 45.

In further explanation, the mandrel 41 has a small-diameter shaft section 42 formed with the screw shaft 45 and a tubular shaft section 43 formed so as to continuously connect to the small-diameter shaft section 42 and larger in outer diameter than the small-diameter shaft section 42, and having a predetermined inner diameter in FIG. 4. Further, the tubular shaft section 43 is integrally connected to a drive shaft section 44 attached with the mandrel drive handle 50. For example, an inner-diameter joint section 44*a* of the drive shaft section 44 is inserted into an inner-diameter section of the tubular shaft section 43 to be fixed by a pin 44*b*.

FIGS. 1(*a*) and 1(*b*) illustrate a state where the mandrel assembly 40 has been disposed horizontally, FIG. 1(*a*) is a central longitudinal sectional view and FIG. 1(*b*) is a plane view. FIG. 1(*c*) is a front view of a pivotal claw 80.

The small-diameter shaft section 42 of the mandrel 41 is constituted as the screw shaft 45 where a male screw 70 which can be screwed to an inner-diameter screw section (female screw) of the tangless spiral coil insert 100 over a predetermined length L from a left end in FIGS. 1(*a*) and 1(*b*) has been formed.

According to this embodiment, the pivotal claw 80 is attached to the small-diameter shaft section 42 and the tubular shaft section 43 of the mandrel 41 along an axial direction of the mandrel 41. A leading end face 81*a* of the pivotal claw 80 is disposed so as to be retreated from a leading end face 42*a* of the screw shaft 45 inward by a predetermined distance L45*a* (a length of about one to five thread ridges). A region 45*a* of the length L45 a of the screw shaft 45 functions as a guide section when the screw shaft 45 is inserted into the coil insert 100, as described later in detail.

In this embodiment, as shown in FIGS. 1(*a*) and 1(*b*), one pivotal-claw attachment groove 71 is formed from the left end face 42*a* of the mandrel 41 in the axial direction by a length L71 over an entire region (namely, L71*a* (=L42)) of the small-diameter shaft section 42 a length of which is set to the length L42 and a region of the length L71*b* of the tubular shaft section 43. In the small-diameter shaft section 42, the pivotal-claw attachment groove 71 is formed to have a depth H toward a center direction of the small-diameter shaft section 42 and a width W, and in the tubular shaft section 43, the pivotal-claw attachment groove 71 is formed so as to extend through a thickness section of the tubular shaft section 43. The left end section on the figure of the pivotal-claw attachment groove 71 of the small-diameter shaft section 42 is opened in the end face 42*a* of the screw shaft 45.

As specific dimensions for reference, in this embodiment, setting has been made such that a length L42 of the small-diameter shaft section 42=20 mm, an outer diameter D of the screw shaft 45=5 mm, and a length L of the screw shaft 45=7 mm (L45*a*=1 mm) in the mandrel 41. Setting has been made such that the tubular shaft section 43 has a length L43=40 mm, an inner diameter d43=7 mm, and an outer diameter D43=8 mm, and setting has been made such that a length L44 of the drive shaft section 44=53 mm (L44*a*=14 mm), and an outer diameter D44=8 mm (D44*a*=7 mm). Setting has been made such that the pivotal-claw attachment groove 71 has a length L71*a* (=L42)=20 mm, L71*b*=24 mm, and a depth H=4.5 mm.

The pivotal claw 80 is a slender member, in particular in this embodiment, a plate member made of a metal having a thickness (t)=1.3 mm, for example, made of a steel, and it is movably attached in the pivotal-claw attachment groove 71 set to have a width (W) slightly larger than the plate thickness (t)=1.3 mm, for example, W=1.4 to 1.5 mm. Further, the pivotal claw 80 is swingably attached to the tubular shaft section 43 by a pivotal shaft 84 via a pivotal-shaft reception hole 84*a* at a central section in the longitudinal direction.

In further explanation, the pivotal claw 80 is composed of an activation section 82 positioned in the small-diameter shaft section 42 on a left side of the pivotal shaft 84 and a support section 83 positioned in the tubular shaft section 43 on a right side of the pivotal shaft 84.

A width W2 of the actuation section 82 is set narrower than a width W3 of the support section 83. The width W3 of the support section 83 is set to a narrowest width W3 min in a continuous connection section thereof with the actuation section 82 and it is set to a largest width W3 max in a rear end region of the support section 83. The width W3 max of the support section 83 is made slightly smaller than the inner diameter d43 of the tubular shaft section 43 such that the actuation section 82 can be pivoted about the pivotal shaft 84. A gap g1 is provided between an upper face 83*a* of the support section 83 and an inner wall of the tubular shaft section 43. Further, an lower face 83*b* of the support section 83 is also set to have a shape inclined upward from a rear end position toward the pivotal shaft 84, and a gap g2 gradually increasing is formed between a lower face 83*b* of the support section 83 and the inner wall of the tubular shaft section 43.

As specific dimensions for reference, in this embodiment, setting has been made such that an entire length L80 of the pivotal claw 80=46 mm, setting has been made such that a length L82 of the actuation section 82 from a leading end (a left end in FIG. 1) of the pivotal claw 80 to the pivotal-shaft reception hole 84*a*=23 mm, and a width W2=1.53 mm, and setting has been made such that a length L83 of the support section 83 from the pivotal-claw reception hole 84*a* to a rear end (a left end in FIG. 1)=23 mm, and the maximum width W3 max=4.5 mm, the minimum width W3 min=3.5 mm. Further, the actuation section 82 is inclined at an angle θ1=4° to the support section 83 from a position of the distance L80 *a*=30 mm from the leading end 81*a*.

Further, setting has been made such that a length L82*a* of the actuation section 82=18.5 mm and a length L83*a* of the support section 83=26 mm. In the above configuration, as shown in FIG. 1(*c*), a level-difference section 85 is formed in a connection section between the actuation section 82 and the support section 83, and in this embodiment, setting is made such that an angle θ2 forming this level-difference section 85=120°. Accordingly, a length L85 of the level-difference section 85 is set to about 1.5 mm.

In a region of the leading end 81*a* of the actuation section 82 of the pivotal claw 80, on the left side in FIG. 1, as described above, a claw section 81 is informed. The claw section 81 engages with the notch 101 of the end coil section 100*a* on the inlet side of the tangless spiral coil insert when the screw shaft 45 is disengaged from the coil insert by reversing the mandrel 50 after the screw shaft 45 has been inserted into the coil insert attached to the work by temporarily rotating the mandrel drive handle 50. That is, the claw section 81 is formed in a plate-thickness end face region of the predetermined length L81 from the leading end 81*a* of the actuation section 82 constituted as a plate member. The details of the claw section 81 will be described later.

Incidentally, the leading end face 81*a* of the claw section 81 is located at a position retreated by a predetermined distance L45 a from the leading end face (a left face in FIG. 1) 42*a* of the screw shaft 45. The region 45*a* of the length L45 a of the screw shaft 45 functions as a guide section for first screwing the leading end screw shaft 45 into about one to five thread ridges (ordinarily the number of thread ridges is about one to two) of the female screw in the inlet section region of the coil insert 100 when performing a work for extracting the coil insert 100 installed in the work by the coil insert extraction tool 1. Therefore, in order to enhance the function as the guide section, in this embodiment, regarding the shape dimensions of the above mandrel 41, the length L42 of the small-diameter shaft section 42 can be increased from 20 mm to 26 mm and the length L can be increased from 7 mm to about 13 mm (L45 a is increased from 1 mm to 6 mm).

Incidentally, alternatively, as shown in FIG. 2, a shaft-shaped guide section projecting outward in an axial direction of the screw shaft 45 to fit the inner-diameter section of the coil insert 100 installed in the work, which is obtained by removing the thread ridges in the leading end region L70*a* of the screw shaft 45, can be adopted.

Thus, by providing the region 45*a* functioning as the guide section having the predetermined length in the leading end section of the screw section 45, a predetermined extraction workability can be improved.

On one hand, a rear end face (the right end face in FIG. 1) of the support section 83 of the pivotal claw 80 is constituted as an inclined face 87 inclined by an angle α in a widthwise direction to a vertical line extending at a right angle of an inner wall face of the tubular shaft section 43 in FIG. 1(*a*). In this embodiment, the angle α has been set to 5°. However, the angle α is not limited to only this value.

As shown in FIG. 1(*c*), a pressing force (A) from the biasing means 88 is imparted to this inclined face 87 and the inclined end face 87 of the support section 83 is pressed downward (B), so that the claw section 81 of the pivotal claw 80 can be pivoted upward (C) to engage with the notch 101 of the tangless spiral coil insert 100. Further, when the claw section 81 is pushed downward, the inclined face 87 is made movable upward.

In this embodiment, the biasing means 88 is provided with a compression coil spring 88*a* housed inside the tubular shaft section 43 and a spring reception member 88*b* caused to abut on the inclined end face 87 of the support section 83 of the pivotal claw 80 by the compression coil spring 88*a*. The spring reception member 88*b* is constituted as a step-like short shaft member and is formed of a large-diameter section 88*b*1 abutting on the compression coil spring 88*a* and a small-diameter section 88*b*2 abutting on the inclined end face 87. As described above, the spring reception member 88*b* is pressed (A) to the inclined end face 87 of the pivotal claw 80 by the compression coil spring 88*a*, thereby pressing the inclined end face 87 of the pivotal claw 80 downward (B) in FIG. 1(*c*). Accordingly, as described above, the claw section 81 of the pivotal claw 80 is biased outward in the radial direction (C) of the screw shaft 45. Thereby, as described later in detail, the hook section 90 formed on the claw section 81 elastically engages with the notch 101 of the tangless spiral coil insert 100.

Figure 6:
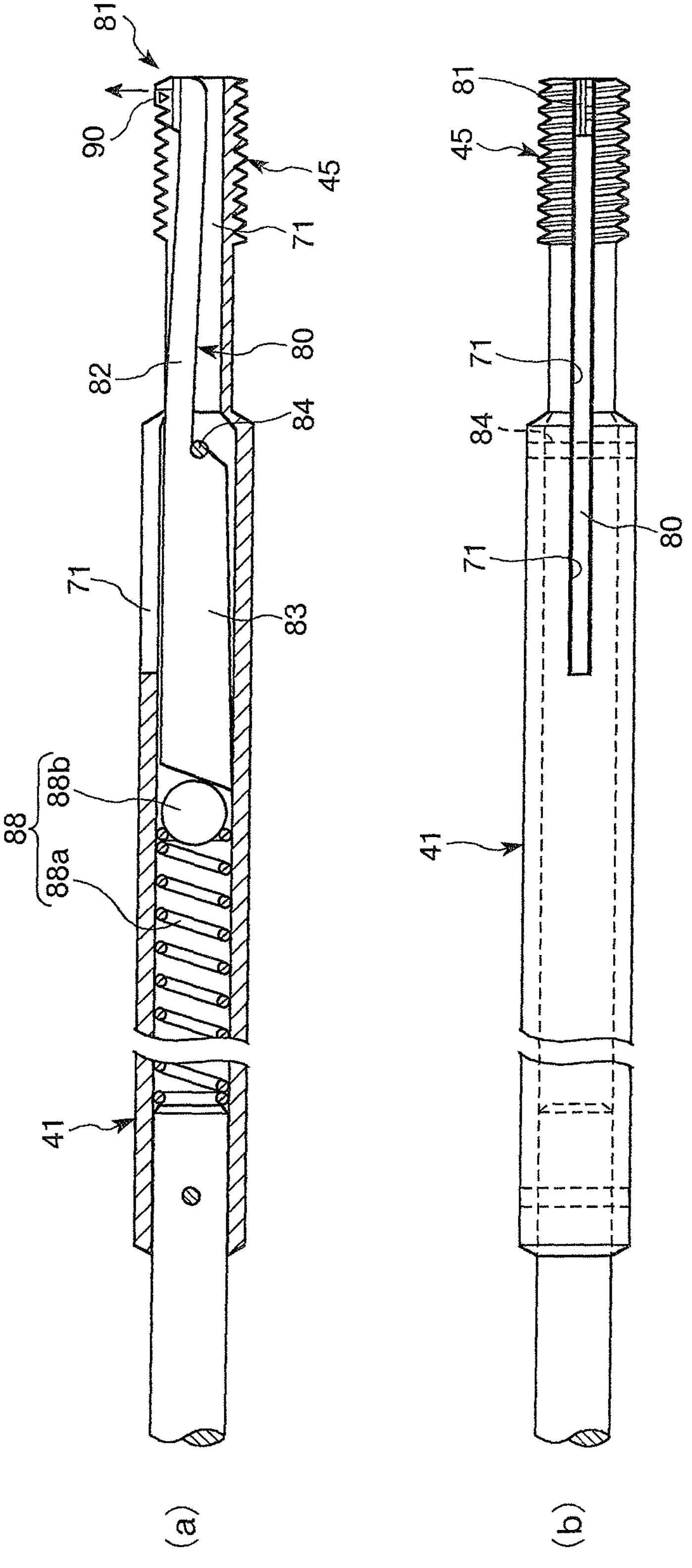
FIG. 6 shows an insertion tool for a tangless spiral coil insert developed by the present inventor and described in patent literature 2, FIG. 6(*a*) is a central longitudinal sectional view of a mandrel to which a pivotal claw has been attached in the insertion tool for a tangless spiral coil insert, and FIG. 6(*b*) is a front view of the mandrel to which the pivotal claw has been attached.
Figure 7:
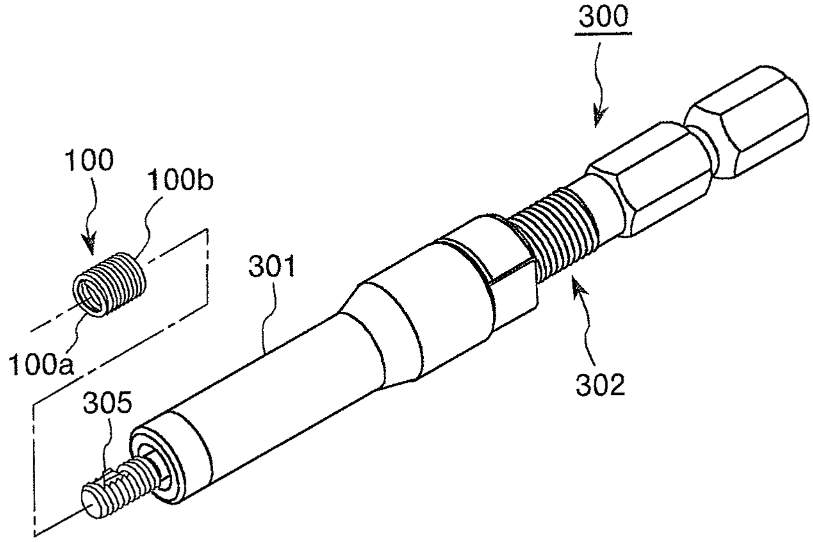
FIG. 7 is a perspective view showing one example of a conventional insertion tool for a tangless spiral coil insert.
Figure 8:
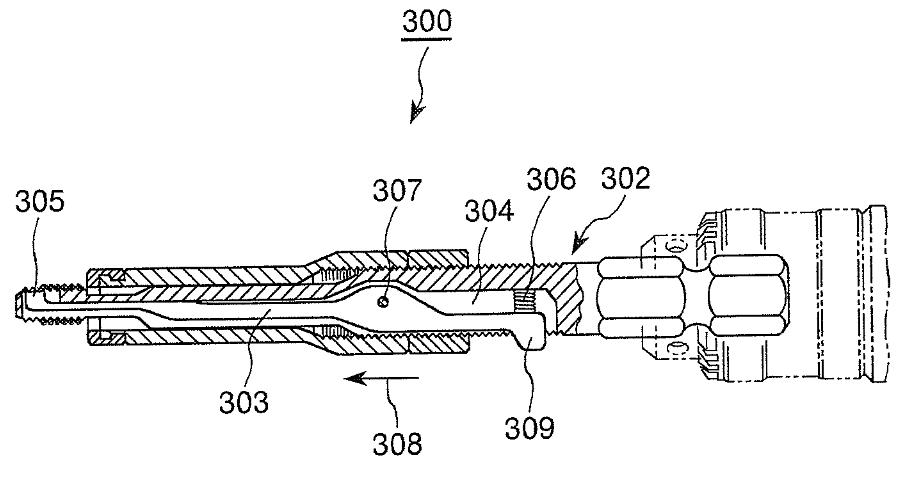
FIG. 8 is a sectional view of the conventional insertion tool for a tangless spiral coil insert shown in FIG. 7.
Figure 9:
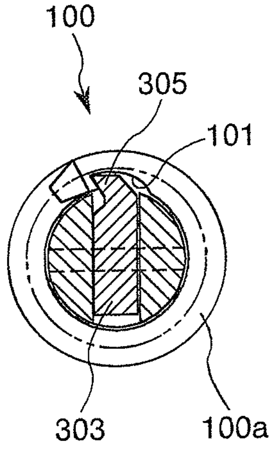
FIG. 9 is a front view for explaining a state of engagement between a hook section of a claw section of an insertion tool for a tangless spiral coil insert and a notch of an end coil section of a spiral coil insert.

Of course, the biasing means 88 is not limited to only the above configuration, but for example, a ball caused to abut on the inclined end face 87 of the support section 83 of the pivotal claw 80 by the compression coil spring 88*a* can be adopted instead of the spring reception member 88*b*, as shown in FIG. 6(*a*).

Next, the claw section 81 of the pivotal claw 80 will be described.

As described above, the extraction tool 1 for a tangless spiral coil insert of the present invention is one for extracting the tangless spiral coil insert 100 which has been already attached to the work 200, and accordingly, as shown in FIGS. 5(*a*) to 5(*d*), the screw shaft 45 of the mandrel 41 is screwed from the inlet side of the coil insert 100 into the other end opposite thereto, namely, into the coil insert by causing the leading end screw shaft 45 of the extraction tool 1 for a tangless spiral coil insert to adapt to the inlet side of the coil insert 100 attached to the work 200 and performing rotation with the mandrel drive handle 50. Next, when the mandrel 50 is reversed, the screw shaft 45 is rotated reversely to the last rotation to be returned from inside of the coil insert to the inlet side.

Accordingly, as described above, the claw section 81 is formed at the leading end section of the actuation section 82 of the pivotal claw 80 of the extraction tool 1 of the present invention on the left side in FIG. 1. The claw section 81 engages with the notch 101 of the end coil section 100*b* on the inlet side of the tangless spiral coil insert 100 when the screw shaft 45 is disengaged from the coil insert 100 by rotating the mandrel 50 reversely after the screw shaft 45 is screwed into inside of the coil insert which has been attached to the work 200 by rotating the mandrel drive handle 50. That is, the claw section 81 is formed in a plate thickness end face region of the predetermined distance L81 from the leading end 81*a* of the actuation section 82 constituted as a plate member. Next, details of the claw section 81 will be described.

A hook section 90 is formed in the claw section 81 of the pivotal claw 80. This hook section 90 engages with the notch 101 of the end coil section 100*b* on the inlet side of the coil insert 100, namely, on the side of insertion of the tool for the coil insert 100 which has been attached to the work 200 at an extraction time of the tangless spiral coil insert 100, as is understood also with reference to FIGS. 3(*a*) to 3(*d*).

The claw section 81 is constituted as an approximately-rectangular plate member having predetermined shape dimensions, namely, the length L81 and the thickness T1, the width W1 (namely the plate thickness (t) of the pivotal claw 80), and movable smoothly in a radial direction of the screw shaft 45 within the pivotal-claw attachment groove section 71.

An upper face of the claw section 81 is set so as to be approximately equal to an outer diameter of the screw shaft 45 or project slightly in the radial direction. The claw section 81 can be pushed into the attachment groove 71 against the biasing means 88 to the support section 83, namely, a biasing force of the compression coil spring 88*a* by pushing the upper face thereof in a center direction of the screw shaft 45.

Further, with reference to FIG. 3(*a*), the claw section 81 will be described. FIG. 3(*a*) illustrates one example of the claw section 81 used in this embodiment. Further, one example of the tangless spiral coil insert 100 is illustrated in FIG. 3(*d*).

Figure 3:
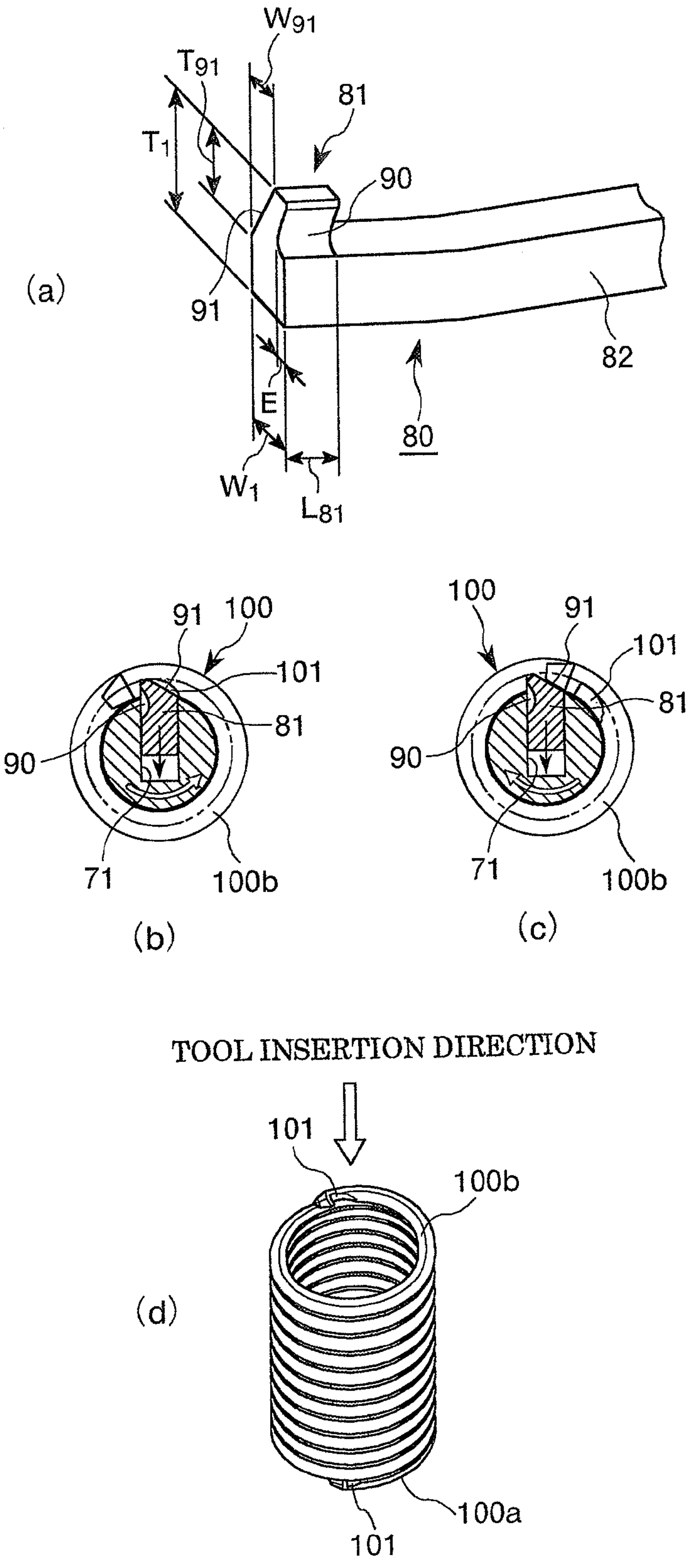
FIG. 3(*a*) is a perspective view of a claw section of the pivotal claw, FIG. 3(*b*) is a front view for explaining a state of engagement between a hook section of the claw section and a notch of an inlet-side end coil section of a spiral coil insert, FIG. 3(*c*) is a front view for explaining a state of engagement between an inclined section of the claw section and the notch of the inlet-side end coil section of the spiral coil insert, and FIG. 3(*d*) is a perspective view of the spiral coil insert.

In this embodiment, the hook section 90 is formed on one face of the claw section 81, namely, on a face on a near side thereof in FIG. 3(*a*). The hook section 90 elastically engages with the notch 101 of the end coil section 100*b* on the inlet side of the oil insert 100 at a reverse rotation time after the hook section 90 has rotated together with the screw shaft 45 to be screwed into the tangless spiral coil insert 100, as shown in FIG. 3(*b*). The hook section 90 can be formed in a shape engaging with the notch 101 of the end coil section 100*b* (see FIG. 3(*d*)) of the coil insert 100. A depth E of a recess of the hook section 90 is set such that the notch 101 of the coil insert

100 is maintained in the recess 90 to continue to contact with a concave face of the recess during extraction work, as shown in FIGS. 3(*a*) and 3(*b*).

Incidentally, in this embodiment, an inclined section 91 is formed on the opposite side (a rear face) to the hook section 90. The inclined section 91 constitutes a guide function for the end coil section 100*b* (FIG. 3(*d*)) of the coil insert 100 to push the claw section 81 slightly projecting for an outer periphery of the screw shaft inward against a biasing force imparted by the biasing means 88 to screw the claw section 81 into the screw shaft 45 smoothly when screwing the screw shaft 45 into the coil insert 100 which has been attached to the work, as shown in FIG. 3(*c*).

As specific dimensions of the claw section 81 for reference, in this embodiment, setting has been made such that a length L81=1.6 mm, a height T=2.5 mm, and a width W1 (=t)=1.3 mm in FIG. 3(*a*). A recess amount E of the hook section 90 is set to about 0.1 to 0.3 mm.

The shape of the claw section 81 is not limited to one having the structure shown in the above embodiment explained with reference to FIG. 3(*a*), but other various modifications may be anticipated by persons skilled in the art.

(Motion Aspect and Operation Method of the Tool)

Next, particularly, with reference to FIGS. 5(*a*), 5(*b*), 5(*c*) and 5(*d*), a motion aspect and an operational method of the extraction tool 1 for a spiral coil insert of the present invention thus configured will be described.

First, as shown in FIG. 5(*a*), the leading end section of the screw shaft 45 of the extraction tool 1 for a spiral coil insert is caused to face the end coil section 100*b* on the inlet side (namely, a surface side of the work 200) of the coil insert 100 which has been attached to the work 200.

Next, the leading end section of the screw shaft 45 is caused to adapt to the inlet-side end coil section 100*b* of the coil insert 100 and the mandrel drive handle 50 is rotated in a predetermined direction (here, in a clockwise direction as viewed from the tool side to the coil insert side) indicated by an arrow, as shown in FIG. 5(*b*). Thereby, as shown in FIG. 5(*b*), first, the leading end guide section 45*a* (for example, about one to two thread ridges) of the screw shaft 45 is screwed into the inner circumferential screw section of the coil insert 100. By further rotating the mandrel drive handle 50, the screw shaft 45 is screwed in the direction of an other-end coil section 100*a* of the coil insert 100, namely, into the inside of the coil insert 100, and the hook section 90 of the claw section 81 which has been installed in the screw shaft 45 reaches the notch 101 of the inlet-side end coil section 100*b* of the spiral coil insert 100.

Of course, in the case that the thread ridges are not formed on the leading-end guide section 45*a* of the screw shaft, as shown in FIG. 2, the leading-end guide section 45*a* of the screw shaft 45 is caused to adapt to the inlet-side end coil section 100*b* of the coil insert 100 and it is inserted into the inside of the coil insert 100, as shown in FIG. 5(*b*). Next, the mandrel drive handle 50 is rotated in the predetermined direction (clockwise direction) indicated by the arrow. Thereby, the leading end thread ridges of the screw shaft 45 start to screw to the inner circumferential screw section of the coil insert 100. By further rotating the mandrel drive handle 50, the screw shaft 45 is screwed in the direction of the other-end coil section 100*a* of the coil insert 100, namely, into inside of the coil insert 100, and the hook section 90 of the claw section 81 which has been installed in the screw shaft 45 reaches the notch 101 of the leading-end coil section 100*b* of the spiral coil insert 100.

Even in each case described above, by further rotating the mandrel drive handle 50 in the predetermined direction (clockwise direction), as shown in FIG. 3(*c*), the inclined section 91 formed on the opposite side (rear face) of the hook section 90 abuts on the end coil section 100*b* of the coil insert 100, thereby pushing the claw section 81 slightly projecting from the outer periphery of the screw shaft inward against a biasing force imparted by the biasing means 88, which results in smooth screwing of the claw section 81 into the screw shaft 45.

At a time point at which approximately an entirety of the hook-section screw shaft 45 has been screwed into the coil insert 100, namely, the claw section 81 is introduced into the coil insert 100, the screw shaft 45 is located at a position of at least two, three or more female screw thread ridges of the coil insert 100.

In this state, as shown in FIG. 5(*c*), when the mandrel drive handle 50 is rotated in the reverse direction (counterclockwise direction) indicated by an arrow, the screw shaft 45 is moved in a disengagement direction from the coil insert 100, namely, in the direction of the inlet-side end coil section 100*b* of the coil insert 100. Then, the hook section 90 of the claw section 81 which has been installed in the screw shaft 45 reaches the notch 101 of the leading-end coil section 100*b* of the spiral coil insert 100. The claw section 81 engages with the notch 101 of the end coil section on the inlet side of the tangless spiral coil insert 100, as shown in FIG. 3(*b*). Accordingly, by performing rotation of the mandrel drive handle 50 continuously, the tangless spiral coil insert 100 is reversely rotated by the hook section 90 of the claw section 81, so that the spiral coil insert 100 is removed from the work 200, as shown in FIG. 5(*d*).

According to this embodiment, the spiral coil insert 100 can be extracted from the work 200 with good workability.

In the above embodiment, the present invention has been described as the manual extraction tool for a tangless spiral coil insert, but the present invention can be applied similarly to an electric extraction tool for a tangless spiral coil insert to obtain similar operation and effect. An entire configuration of the electric extraction tool for a spiral coil insert, except for the characterized sections of this invention, is well-known to persons skilled in the art. Accordingly, further detailed description is omitted.

DESCRIPTION OF REFERENCE NUMERALS

1 Extraction tool for a spiral coil insert
40 Mandrel assembly
41 Mandrel
42 Small-diameter shaft section
43 Tubular shaft section
44 Drive shaft section
45 Mandrel screw shaft
45*a* Guide section
70 Male screw
71 Pivotal-claw attachment groove
80 Pivotal claw
81 Claw section
82 Actuation section
83 Support section
84 Pivotal shaft
85 level-difference section
86 Notched recess
87 Inclined end face
88 Biasing means
88*a* Compression coil spring
88*b* Spring reception member
90 Hook section

The invention claimed is:

1. An extraction tool for extracting a tangless spiral coil insert from a work to which the coil insert is attached, the coil insert having a notch at an end coil section thereof positioned on a surface side of the work, the extraction tool comprising:

a mandrel having:

a screw shaft at a leading end section thereof, a small-diameter shaft section formed with the screw shaft, and a cylindrical tubular shaft section extending in a continuous manner from the small-diameter shaft section, an outer diameter of the tubular shaft section being larger than an outer diameter of the small-diameter shaft section;

a pivotal claw constructed of a plate member, the pivotal claw having:

an actuation section, a support section integrally formed with the actuation section and having a rear end face inclined in a widthwise direction, the support section being pivotally attached to the mandrel by a pivotal shaft, and a claw section having a hook for engaging the notch of the coil insert, the claw section being formed in an end-face region of the pivotal claw and extending a predetermined distance from a leading end thereof, an attachment groove formed in the small-diameter shaft section and the tubular shaft section of the mandrel, the attachment groove extending a predetermined length from an end face of the small-diameter shaft section in an axial direction of the mandrel, the pivotal claw being movably received in the attachment groove; and a biasing means housed within the tubular shaft section and acting on the support section of the pivotal claw, the biasing means having:

a compression coil spring, and a spring reception member caused to abut the rear end face of the support section of the pivotal claw by the compression coil spring, wherein engagement of the spring reception member with the rear end face of the support section biases the claw section outward in a radial direction of the screw shaft, such that the hook elastically engages the notch of the coil insert for extraction.

2. The extraction tool of claim 1, wherein the mandrel further includes a guide section integrally formed in a leading end section of the screw shaft, the guide section projecting further outward beyond the pivotal claw by a predetermined length in the axial direction of the mandrel to be capable of being screwed or inserted into the coil insert.

* * * * *